UNITED STATES PATENT OFFICE.

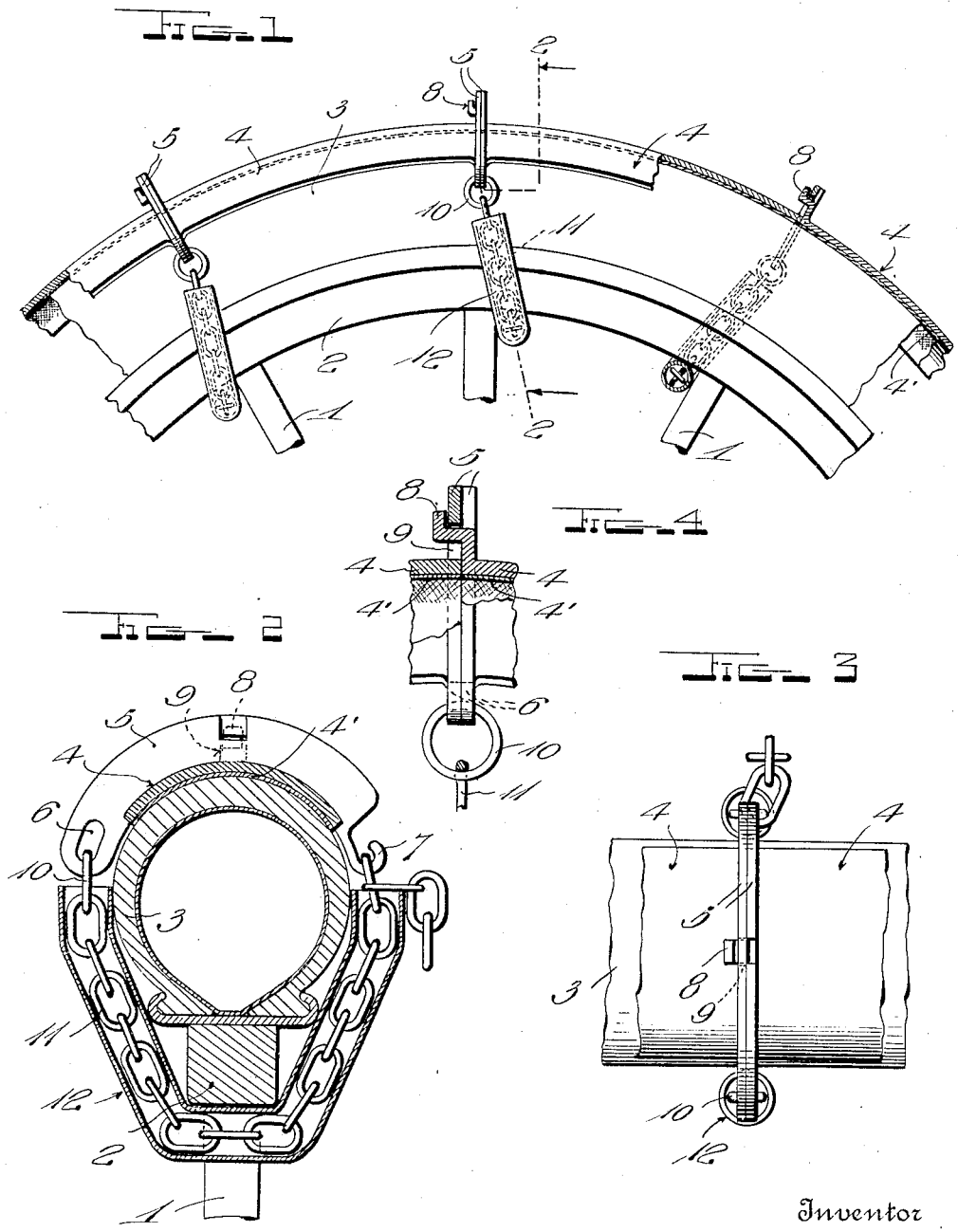

EDWARD C. BROWARD, OF JACKSONVILLE, FLORIDA.

MUD-PULL-OUT ATTACHMENT FOR AUTO-WHEELS.

1,371,347.  Specification of Letters Patent.  Patented Mar. 15, 1921.

Application filed November 12, 1919. Serial No. 337,437.

*To all whom it may concern:*

Be it known that I, EDWARD C. BROWARD, a citizen of the United States, residing at Jacksonville, in the county of Duval and State of Florida, have invented certain new and useful Improvements in Mud-Pull-Out Attachments for Auto-Wheels; and I do declare the following to be a full, clear, and exact description of the invention, such as will enable others skilled in the art to which it appertains to make and use the same.

This invention relates generally to motor vehicle accessories, and more particularly to motor vehicle tire shoes or mud pull-out attachment.

The primary object of the invention is to provide a device consisting of a set of interlocking shoes adapted for attachment to a motor vehicle wheel, and when attached capable of causing the wheel to become extricated from mud holes, sand holes, or other soft places in the road under the power of the motor vehicle.

A further object of the invention is to provide a shoe of this character which can be readily and easily applied to a motor vehicle wheel after the same has become embedded in a mud hole or the like, and just as readily and easily detached therefrom.

An additional object of the invention is to provide a device of this nature which will be extremely simple, strong, durable and inexpensive in construction, and one which will be well adapted to the purpose for which it is designed.

With these and other objects in view, the invention consists of the novel features of construction, and the combination and arrangement of parts as will be hereinafter fully described and claimed.

In the accompanying drawings in which similar reference characters designate like parts throughout the several views, Figure 1 is a side elevation of a portion of a motor vehicle wheel, showing a device constructed in accordance with this invention applied thereto, said device being shown partly in elevation and partly in section;

Fig. 2 is a transverse sectional view taken substantially on the line 2—2 of Fig. 1;

Fig. 3 is a plan view of a portion of the shoe; and,

Fig. 4 is an enlarged detail sectional view illustrating particularly the manner in which the sections of the shoe are coupled together.

In the embodiment illustrated a portion of a motor vehicle wheel is shown, the numeral 1 indicating the spokes, 2 the felly, and 3 the tire. Disposed upon the periphery of the wheel, that is, upon the tread portion of the tire 3 is a shoe composed of a series of abutting or longitudinally arranged sections or shoes 4. The sections or shoes 4 are curved longitudinally and transversely so as to shape them to fit nicely upon the tread portion of the tire. The inner sides of the shoes 4 are lined with strips of canvas 4' to protect the tire from abrasion. The ends of the shoes 4 are bent outwardly to provide flanges 5, one of the ends of which extends beyond adjacent edges of the shoes and are provided with elongated openings 6. The other ends of the flanges 5 terminate substantially at the other edges of the shoes as shown, but formed integrally with these last mentioned ends of the flanges are hooks 7. Stamped from the flanges at one of the ends of the shoes 4 are tongues 8, the latter being right angular in shape having portions extending outwardly at right angles to these flanges and having their free ends bent outwardly at right angles to these portions. The flanges at the other ends of the shoes are provided with elongated openings 9 adapted to receive the tongues 8. When the shoes 4 are arranged in abutting relation as shown in the drawings and the abutting flanges of adjacent shoes coincide with one another, the openings 6 in said adjacent shoes will aline, while the hooked or out turned free ends of the tongues 8 will hook around the outer edges of the openings 9 with which they are engaged. The shoes 4 are thus interlocked or coupled together.

Inserted through the alined openings 6 of the abutting flanges 5 are rings 10, and to these rings are connected one of the ends of chains 11, carrying if desired suitable protective coverings 12, preferably in the form of leather sleeves. When the structure made up of a number of shoes 4 is placed upon the tread portion of the tire, the chains 11 are passed around the felly of the wheel and one of the links at the free ends thereof is engaged by the hooks 7. As shown, the chains are passed around the felly on different sides of the spokes of the wheel so that circumferential movement of the device upon the tire is prevented.

The device is intended to be used when the driving wheels of a motor vehicle have become embedded in a mud hole, a sand hole, or some other soft place in the road. When such is the case and the driving wheels slip and will not extricate themselves out of the holes, then the device is to be placed upon one of the driving wheels. When this has been done and the power is applied to the driving wheel, the outwardly extending flanges 5 will cause the wheel to obtain a grip in the mud hole or whatever soft place it is embedded in, and extricate it out of said soft place. The flanges thus serve in the capacity of mud or anti-slipping lugs in addition to carrying the means for interlocking or coupling the shoes together. By having the flanges carried by adjacent sections arranged in abutting relation, one supports the other, and there is little likelihood of them being bent out of place or out of shape. The shoes 4 may thus be made out of thinner sheet metal than if such was not the case.

When the device is detached from the wheel and is to be stored away, it can be folded by uncoupling the adjacent shoes 4 except by the rings 10. This is done by moving the shoes 4 so that the flanges 5 will be moved out of their coincident relation until the out turned free ends of the tongues 8 will pass through the openings 9 when the shoes are swung out of their abutting or alining relation with respect to one another upon the rings 10 as hinges. The openings 6 through which the rings 10 pass are elongated a sufficient amount to permit the flanges 5 to be moved out of coincident relation and permit the tongues 8 to be withdrawn from the openings 9.

From the foregoing description, taken in connection with the accompanying drawings, the construction, use, and value of the invention will be readily understood. It will be seen that the objects of the invention have been effectively carried out, as the device is of simple, durable, and cheap construction, and it may easily and readily be attached to motor vehicle wheels or detached therefrom.

Various changes in form, proportion, and in the minor details of construction may be resorted to without departing from the spirit of the invention as defined in the appended claims.

What is claimed is:

1. A device of the class described comprising a plurality of longitudinally alined shoes adapted to fit upon the periphery of a wheel, abutting outwardly and transversely extending flanges at the ends of said shoes, each shoe having the flange at one of its ends provided with a coupler receiving opening intermediate the width of the shoe, coupling means carried by the flange at the opposite end of the shoe for passing through the opening in the abutting flange of an adjoining shoe, and means carried by said shoes for fastening them upon the wheel.

2. A device of the class described comprising a plurality of alined shoes adapted to fit upon the periphery of a wheel, outwardly extending flanges at the ends of said shoes and those at the abutting ends of adjacent shoes abutting each other, tongues formed upon the intermediate portions of the flanges at one of the ends of said shoes, the intermediate portions of the flanges at the other ends of said shoes having openings therein in which said tongues are detachably engaged to couple said adjacent sections together, and means for fastening said shoes upon the wheel.

In testimony whereof I have hereunto set my hand.

EDWARD C. BROWARD.